United States Patent
Tsai et al.

(10) Patent No.: US 8,212,174 B2
(45) Date of Patent: Jul. 3, 2012

(54) CASING AND PLASMA JET SYSTEM USING THE SAME

(75) Inventors: Chen-Der Tsai, Hsinchu County (TW);
Wen-Tung Hsu, Hsinchu County (TW);
Chin-Jyi Wu, Kaohsiung (TW);
Chih-Wei Chen, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 571 days.

(21) Appl. No.: 12/537,279

(22) Filed: Aug. 7, 2009

(65) Prior Publication Data

US 2010/0147808 A1 Jun. 17, 2010

(30) Foreign Application Priority Data

Dec. 12, 2008 (TW) .............................. 97148615 A

(51) Int. Cl.
*B23K 9/00* (2006.01)
(52) U.S. Cl. ........... 219/121.5; 219/121.39; 219/121.44; 219/121.51; 219/121.56; 219/76.16
(58) Field of Classification Search ............... 219/75, 219/76.16, 121.5, 121.11, 121.36–56, 124.1
See application file for complete search history.

(56) References Cited

U.S. PATENT DOCUMENTS

| | | | |
|---|---|---|---|
| 3,866,089 A * | 2/1975 | Hengartner | 315/111.21 |
| 4,841,114 A * | 6/1989 | Browning | 219/121.47 |
| 5,340,961 A * | 8/1994 | Bebber et al. | 219/121.5 |
| 5,728,991 A * | 3/1998 | Takada et al. | 219/121.46 |
| 6,262,386 B1 * | 7/2001 | Fornsel | 219/121.52 |
| 6,265,690 B1 * | 7/2001 | Fornsel et al. | 219/121.5 |
| 7,547,861 B2 * | 6/2009 | Jorgensen | 219/121.5 |
| 2002/0179575 A1 * | 12/2002 | Fornsel et al. | 219/121.5 |
| 2005/0126487 A1 * | 6/2005 | Tabuchi et al. | 118/723 E |
| 2010/0044483 A1 * | 2/2010 | Foret | 241/39 |
| 2010/0164353 A1 * | 7/2010 | Tsai et al. | 313/231.31 |

OTHER PUBLICATIONS

Chinese language office action dated Jul. 25, 2011.

* cited by examiner

*Primary Examiner* — Michael Lebentritt
(74) *Attorney, Agent, or Firm* — Thomas|Kayden

(57) ABSTRACT

A casing is used for being rotatably disposed in a plasma jet system. The casing is rotated around a central axis. The casing comprises a main body and a plasma nozzle. The main body has a first cavity. The plasma nozzle is disposed under the main body and has a second cavity and a straight channel. The second cavity is connected to the first cavity. The straight channel is located at a side of the plasma nozzle opposite to the main body and connected to the second cavity. The straight channel has an extension axis which is substantially parallel with the central axis and separated from the central axis by an interval. Plasma generated by the plasma jet system jets out through the straight channel.

11 Claims, 3 Drawing Sheets

CASING AND PLASMA JET SYSTEM USING THE SAME

This application claims the benefit of Taiwan application Serial No. 97148615, filed Dec. 12, 2008, the subject matter of which is incorporated herein by reference.

TECHNICAL FIELD

The invention relates in general to a casing and a plasma jet system using the same, and more particularly to a casing having a straight channel for jetting plasma therethrough and a plasma jet system using the same.

BACKGROUND

Generally speaking, because atmospheric pressure plasma technology has a wide application, such as processing or cleaning the surface of a workpiece, and requires only electric power and air, the atmospheric pressure plasma technology has become an essential technology nowadays.

Take the atmospheric pressure plasma technology being applied in an atmospheric-pressure plasma jet device as an example for illustration. Plasma generated by the atmospheric-pressure plasma jet device is jetted out with a high speed for processing the surface of a workpiece. However, the plasma jetted from the atmospheric-pressure plasma jet device normally has a Gauss distribution, such that the jetted plasma distributes in small range. As a result, the time for the atmospheric-pressure plasma jet device to process the workpiece is increased.

Besides, as the energy of the jetted plasma is over concentrated, the processed workpiece has poor uniformity. Also, an electric arc is close to the outlet as the plasma is generated. When a to-be-processed object is a conductor, the electric arc easily acts on the to-be-processed object to damage the surface of the to-be-processed object. Therefore, how to effectively increase the efficiency of processing the workpiece by the atmospheric-pressure plasma jet device and the uniformity of the jetted plasma and control the location of the generated electric arc to save the cost and increase the processing quality is one of the industrial's endeavors.

BRIEF SUMMARY

Embodiments of a casing and a plasma jet system using the same are disclosed. By designing a straight channel on the casing, the distribution range and uniformity of plasma jetted through the straight channel can be increased, so that the efficiency and quality for processing a workpiece are enhanced.

An exemplary embodiment of a casing is provided. The casing is used for being rotatably disposed in a plasma jet system. The casing is rotated around a central axis. The casing comprises a main body and a plasma nozzle. The main body has a first cavity. The plasma nozzle is disposed under the main body and has a second cavity and a straight channel. The second cavity is connected to the first cavity. The straight channel is located at a side of the plasma nozzle opposite to the main body and connected to the second cavity. The straight channel has an extension axis which is substantially parallel with the central axis and separated from the central axis by an interval. Plasma generated by the plasma jet system jets out through the straight channel.

Another exemplary embodiment of a plasma jet system is provided. The plasma jet system comprises a power device, a casing and an inner-electrode combination. The power device is used for supplying a rotation power. The casing is used for receiving the rotation power so as to be rotated around a central axis. The casing has a cavity and a straight channel. The straight channel is connected to the cavity and has an extension axis. The extension axis is substantially parallel with the central axis and is separated from the central axis by an interval. The inner-electrode combination is disposed in the cavity for generating plasma. The plasma is jetted out through the straight channel. In an exemplary embodiment, in order to prevent an electric arc from acting on a to-be-processed object, a plasma nozzle of the casing is preferably designed to have a specific elliptical tip (as marked with 113c in FIG. 1). When the plasma is generated, the elliptical tip (113c) attracts the electric arc as result of the point effect, such that the electric arc acts at the point of the elliptical tip instead of acting at the outlet, thereby greatly preventing the electric arc from damaging the surface of the to-be-processed object.

It is to be understood that both the foregoing general description and the following detailed description are exemplary and explanatory only and are not restrictive of the disclosed embodiments, as claimed.

DETAILED DESCRIPTION OF THE INVENTION

Figure 1:
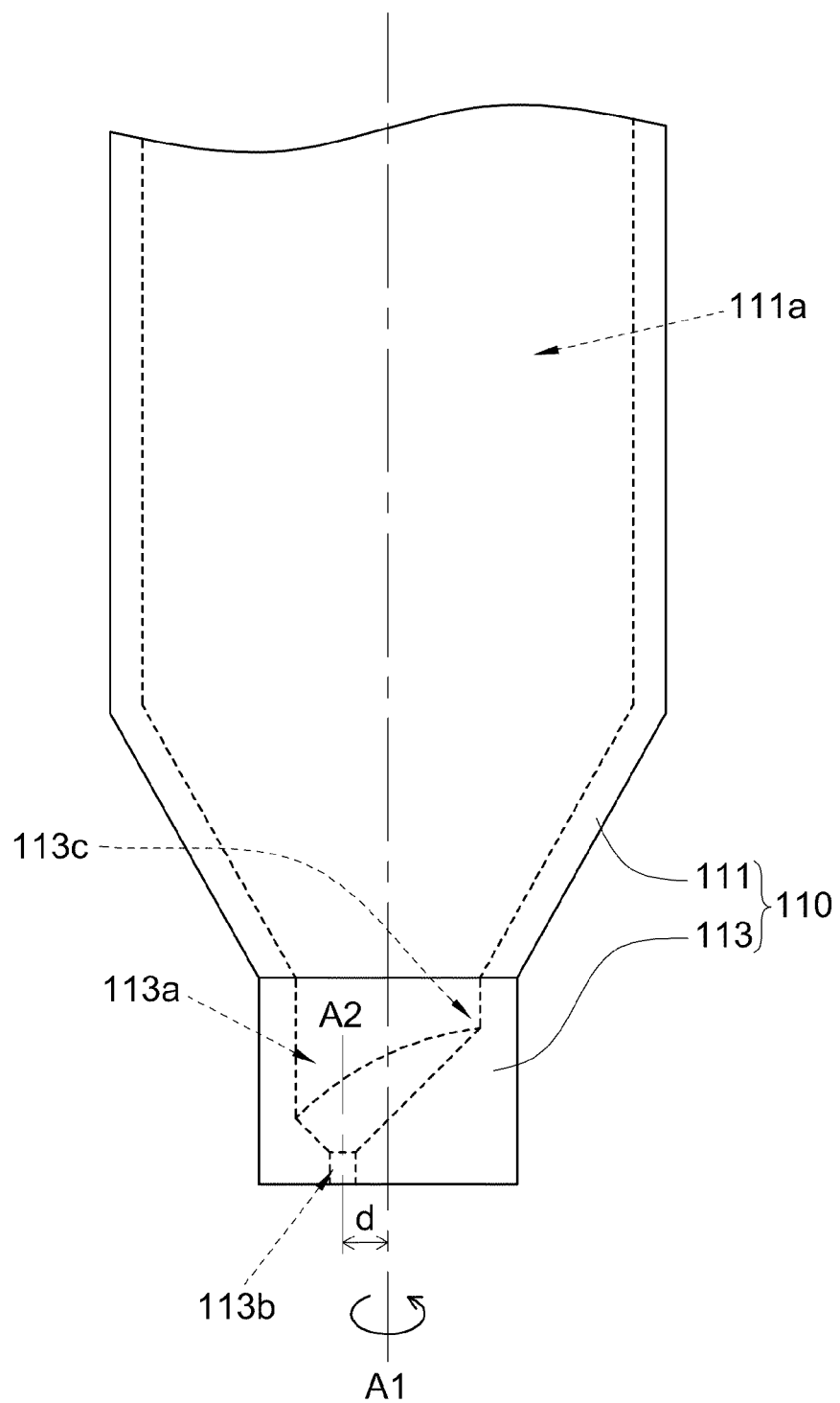
FIG. 1 is a schematic diagram of a casing of an exemplary embodiment.

Referring to FIG. 1, a schematic diagram of a casing of an exemplary embodiment is shown. The casing 110 is used for being rotatably disposed in a plasma jet system. In the present embodiment, the casing 110 is exemplified by being rotated around a central axis A1.

The casing 110 includes a main body 111 and a plasma nozzle 113. The plasmas nozzle 113 is disposed under the main body 111. However, the disposition way of the plasma nozzle 113 has no specific limitation. For example, the plasma nozzle 113 can be fixed to the main body 111 or be detachably disposed on the main body 111.

The main body 111 has a first cavity 111a, and the plasma nozzle 113 has a second cavity 113a and a straight channel 113b. The second cavity 113a is connected to the first cavity 111a. The straight channel 113b is located at a side of the plasma nozzle 113 opposite to the main body 111 and connected to the second cavity 113a.

As shown in FIG. 1, the straight channel 113b has an extension axis A2. The extension axis A2 is substantially parallel with the central axis A1 and is separated from the central axis A1 by an interval d. As a result, plasma generated by the plasmas jet system jets out through the straight channel 113b. In the present embodiment, the interval d has no specific limitation and can be suitably adjusted as needed.

Compared to the plasma jetted through a channel which is coaxial with the central axis of the casing, the plasma generated by the plasma jet system disposed with the casing 110 can have a larger distribution range and higher uniformity. Therefore, the plasma jet system using the casing 110 can greatly increase the efficiency and quality for processing a workpiece, so that the manufacturing cost can be reduced.

Figure 2:
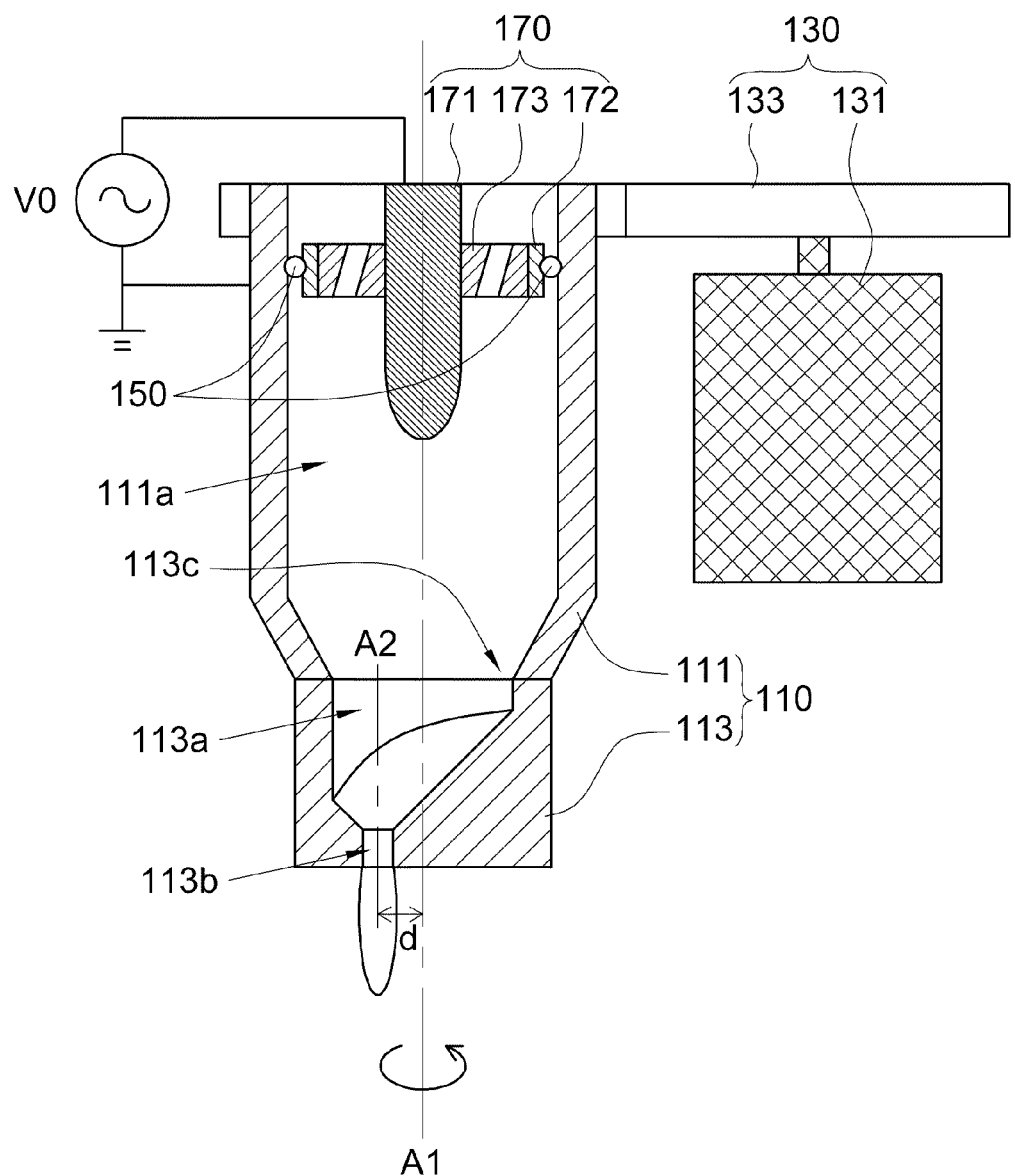
FIG. 2 is a schematic diagram of the plasma jet system having the casing of FIG. 1.

The casing 110 of the present embodiment is exemplified by being disposed in a plasma jet system 100 in FIG. 2 for further illustration. Any one having ordinary skills in the related art can realize that the casing 110 in FIG. 1 is not limited to being disposed in the plasma jet system 100 in FIG. 2.

As shown in FIG. 2, the plasma jet system 100 includes the casing 110 in FIG. 1, a power device 130, a voltage source V0, a rotation mechanism 150 and an inner-electrode combination 170.

In the present embodiment, the casing 110 is a structure having a cavity formed by a first cavity 111a and a second cavity 113a, and the casing 110 is, for example, an axis symmetric structure symmetric to the central axis A1. As mentioned above, the extension axis A2 of the straight channel 113b of the casing 110 is substantially parallel with the central axis A1 and is separated from the central axis A1 by the interval d. Besides, more specifically, the straight channel 113b extends along a direction which is substantially parallel with the extension axis A2 to guide the plasma.

The power device 130 includes a power source 131 and a transmission member 133. The power source 131 is used for supplying rotation power to the casing 110 via the transmission member 133, such that the casing 110 is rotated around the central axis A1. The power source 131 can be a direct-current (DC) motor, an alternating-current (AC) motor or a pneumatic cylinder, and the transmission member 133 can be a belt, a timing belt, a gear set or a chain. The power device 130 of the present embodiment is not limited thereto. As long as a mechanism is capable of supplying and transmitting power to the casing 110, the mechanism can be applied in the present embodiment.

As shown in FIG. 2, the inner-electrode combination 170 is a stator, and the casing 110 is a mover. The rotation mechanism 150 can be disposed between the inner-electrode combination 170 and the casing 110 or at any other position where a differential movement between the mover and the stator can be generated. The casing 110 is rotated around the central axis A1 when receiving the rotation power. At the time, as a result of the disposition of the rotation mechanism 150, the casing 110 is rotated around the central axis A1 and with respect to the inner-electrode combination 170. In other words, when the casing 110 is being rotated, the inner-electrode combination 170 maintains a static state through the disposition of the rotation mechanism 150. In the present embodiment, the rotation mechanism 150 is, for example, a bearing.

The inner-electrode combination 170 disposed in the cavity of the casing 110 includes an inner electrode 171, a dielectric material 172 and an air guiding device 173. The inner electrode 171 is an axis symmetric structure, and the axis of the inner electrode 171 coincides with the central axis A1. The air guiding device 173 is fixed to the inner electrode 171, and the dielectric material 172 is disposed between the casing 110 and the air guiding device 173 to prevent the inner electrode 171 and casing 110 from generating an electric arc.

The voltage source V0 is electrically coupled to the inner electrode 171, and the casing 110 is grounded. When the voltage source V0 supplies a voltage to the inner electrode 171, the air in the inner electrode 171, the casing 110 and the cavity interacts with one another to generate plasma. As a result, the plasma is generated to jet out through the straight channel 113b of the casing 110, so that the distribution range and uniformity of the jetted plasma can be increased.

Figure 3:
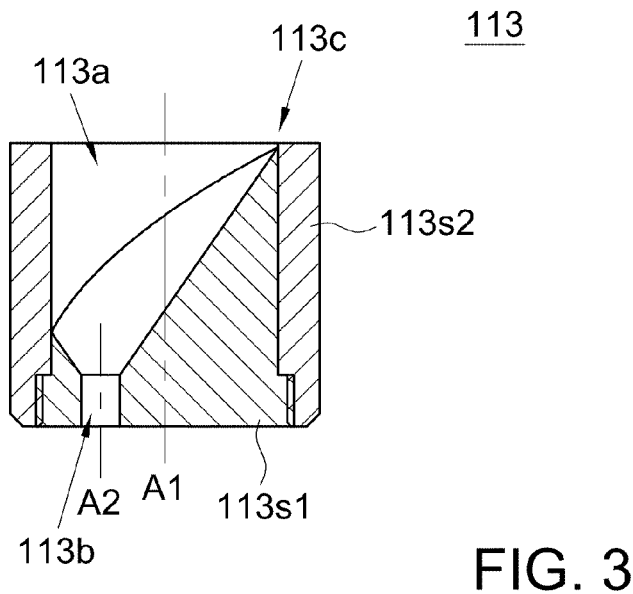
FIG. 3 is a schematic diagram of the plasma nozzle according to the exemplary embodiment.
Figure 4A:
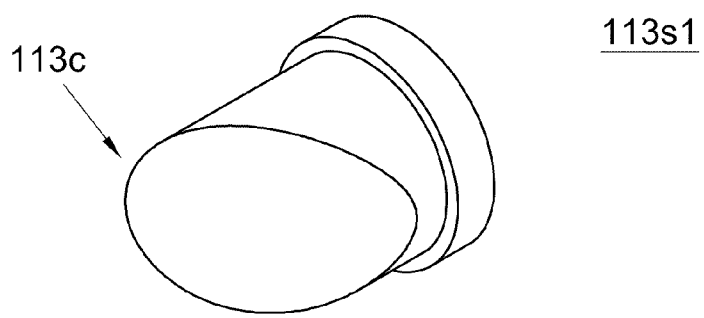
FIG. 4A is a three-dimensional view of an inner structure of the plasma nozzle in FIG. 3.
Figure 4B:
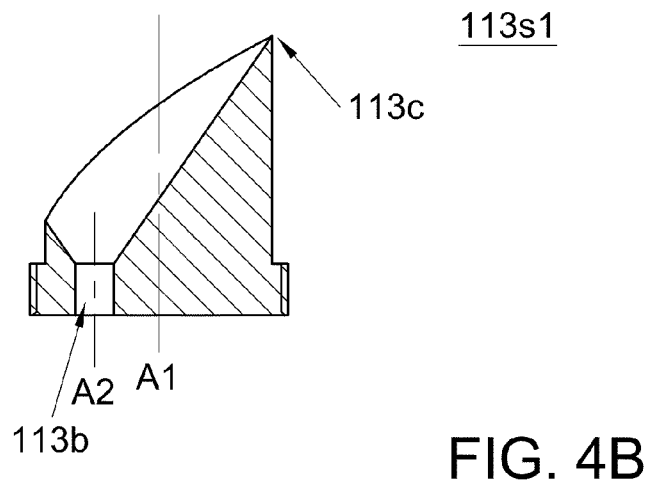
FIG. 4B is a cross-sectional view of the inner structure in FIG. 4A.

Moreover, referring to FIG. 3, a schematic diagram of the plasma nozzle according to the exemplary embodiment is shown. The plasma nozzle 113 can be a structure formed by a combination of an inner structure 113s1 and an outer structure 113s2. The inner structure 113s1 is disposed into the outer structure 113s2. The second cavity 113a is formed between the inner structure 113s1 and the outer structure 113s2. Referring to FIGS. 4A and 4B at the same time, the inner structure 113s1 has the above-mentioned straight channel 113b and an elliptical tip 113c. The elliptical tip 113c is close to the main body 111 (as shown in FIG. 2). When the plasma is generated, the elliptical tip 113c at the top of the inner structure 113s1 of the plasma nozzle 113 attracts the electric arc. Thus, the electric arc acting at the outlet can be prevented so as to greatly reduce the probability that the electric arc damages the surface of the to-be-processed object.

According to the casing and the plasma jet system using the same disclosed in the above embodiment, the straight channel is disposed apart from the central axis of the casing, such that the distribution range and uniformity of the plasma jetted from the straight channel can be increased. Therefore, the efficiency of the plasma jet system using the casing of the embodiment in processing the workpiece can be increased so as to greatly reduce the manufacturing cost.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A casing used for being rotatably disposed in a plasma jet system, the casing being rotated around a central axis, the casing comprising:
   a main body having a first cavity; and
   a plasma nozzle disposed under the main body and having a second cavity and a straight channel, wherein the second cavity is connected to the first cavity, the straight channel is located at a side of the plasma nozzle opposite to the main body and connected to the second cavity, the straight channel has an extension axis which is substantially parallel with the central axis and separated from the central axis by an interval, and plasma generated by the plasma jet system jets out through the straight channel.

2. The casing according to claim 1, wherein the straight channel extends along a direction which is substantially parallel with the extension axis.

3. The casing according to claim 1, wherein the plasma nozzle comprises:
   an inner structure having the straight channel and an elliptical tip which is close to the main body; and
   an outer structure, wherein the inner structure is located in the outer structure;
   wherein, the second cavity is formed between the inner structure and the outer structure.

4. A plasma jet system, comprising:
   a power device used for supplying a rotation power;
   a casing used for receiving the rotation power so as to be rotated around a central axis, wherein the casing has a cavity and a straight channel, the straight channel is connected to the cavity and has an extension axis, and the extension axis is substantially parallel with the central axis and separated from the central axis by an interval; and an inner-electrode combination disposed in the cavity for generating plasma, wherein the plasma jets out through the straight channel.

5. The plasma jet system according to claim 4, wherein the straight channel extends along a direction which is substantially parallel with the extension axis.

6. The plasma jet system according to claim 4, wherein the casing comprises:
   a main body having a portion of the cavity; and
   a plasma nozzle disposed under the main body and having the other portion of the cavity and the straight channel, wherein the straight channel is located at a side of the plasma nozzle opposite to the main body and connected to the other portion of the cavity.

7. The plasma jet system according to claim 6, wherein the plasma nozzle comprises:
   an inner structure having the straight channel and an elliptical tip which is close to the main body; and
   an outer structure, wherein the inner structure is disposed in the outer structure;
   wherein, the other portion of the cavity is formed between the inner structure and the outer structure.

8. The plasma jet system according to claim 4, further comprising:
   a rotation mechanism disposed between the inner-electrode combination and the casing such that the casing is rotated with respect to the inner-electrode combination.

9. The plasma jet system according to claim 4, wherein the inner-electrode combination comprises:
   an inner electrode having an axis coinciding with the central axis;
   an air guiding device fixed to the inner electrode; and
   a dielectric material disposed between the casing and the air guiding device.

10. The plasma jet system according to claim 9, wherein the casing is grounded, and the plasma jet system comprises:
    a power source used for supplying a voltage to the inner electrode.

11. The plasma jet system according to claim 4, wherein the power device comprises:
    a power source for supplying the rotation power; and
    a transmission member, wherein the rotation power is transmitted to the casing through the transmission member.

* * * * *